US008135733B2

(12) United States Patent
Hirayama et al.

(10) Patent No.: US 8,135,733 B2
(45) Date of Patent: Mar. 13, 2012

(54) INFORMATION RETRIEVAL APPARATUS, INFORMATION RETRIEVAL METHOD AND INFORMATION RETRIEVAL PROCESSING PROGRAM

(75) Inventors: Hiroki Hirayama, Kawasaki (JP); Tomohiro Kimura, Kawasaki (JP)

(73) Assignee: Pioneer Corporation, Tokyo (JP)

( * ) Notice: Subject to any disclaimer, the term of this patent is extended or adjusted under 35 U.S.C. 154(b) by 148 days.

(21) Appl. No.: 12/746,031

(22) PCT Filed: Dec. 3, 2007

(86) PCT No.: PCT/JP2007/073326
§ 371 (c)(1),
(2), (4) Date: Jun. 3, 2010

(87) PCT Pub. No.: WO2009/072174
PCT Pub. Date: Jun. 11, 2009

(65) Prior Publication Data
US 2010/0257197 A1    Oct. 7, 2010

(51) Int. Cl.
*G06F 17/30* (2006.01)
*G01F 17/00* (2006.01)
(52) U.S. Cl. ........................ 707/769; 707/770
(58) Field of Classification Search .................. 707/769, 707/770
See application file for complete search history.

(56) References Cited

U.S. PATENT DOCUMENTS

| 2004/0044657 A1 | 3/2004 | Lee |
| 2008/0021891 A1* | 1/2008 | Ikeda ............................... 707/3 |

FOREIGN PATENT DOCUMENTS

| JP | 2002-215642 | 8/2002 |
| JP | 2002-251410 | 9/2002 |
| JP | 2004-510257 | 4/2004 |

OTHER PUBLICATIONS

International Search Report, PCT/JP2007/073326, Dec. 25, 2007.

* cited by examiner

*Primary Examiner* — Charles Rones
*Assistant Examiner* — Fariborz Khoshnoodi
(74) *Attorney, Agent, or Firm* — Young & Thompson

(57) ABSTRACT

A system quickly accesses suitable represented information, in view of a lapse time from retrieval result display to user move. A system control section (SCS) of a retrieval system server accesses a retrieval database registering retrieval priorities to be associated with respective web pages. The SCS sends a retrieval result page on which the retrieval result is to be displayed, from the web page having the higher retrieval priority on a priority basis, receives, after sending the same, a re-retrieval request or a request for the other retrieval result page, indicating a sending request for the new retrieval result page, and measures lapse time "t".

6 Claims, 6 Drawing Sheets

INFORMATION RETRIEVAL APPARATUS, INFORMATION RETRIEVAL METHOD AND INFORMATION RETRIEVAL PROCESSING PROGRAM

TECHNICAL FIELD

The present invention relates to a technical field of an apparatus, a method and a program for retrieving presented information, which is suited to a user's purpose, in accordance with a request provided through a network from terminal equipment, which provides a user with the presented information.

BACKGROUND OF THE INVENTION

There has conventionally been widely known a hyper text system such as WWW (World Wide Web), which is provided in a network such as Internet and permits to browse various kinds of information sources such as web pages, image data and document data, which are widely scattered on the network through a hyper link (hereinafter simply referred to as the "link") embedded on a web page having a description using a markup language such as HTML (Hyper Text Markup Language).

In such a hyper text system, a user generally accesses search sites such as for example Google (trademark), Yahoo (trademark), Infoseek (trademark), etc. with the use of a terminal equipment such as a personal computer to retrieve the information source of the web page required by the user from various kinds of information source scattered on the network.

In such search sites, numerous information sources are normally subject to searches with the use of retrieval key words provided by the users. A challenge is therefore to display the retrieved information source as the retrieval result in how priority, so as to access quickly the information source, which is suited to the user's purpose.

In case of Google (trademark), for example, the priority of the web page (or the web site) is set to become higher with the increased number of links provided by the other web sites, and the priority of the above-mentioned web page is set to become higher with the increased priority of the web site providing the links to the above-mentioned web page.

Patent Document 1 discloses a technical matter in which web pages as retrieved based on a retrieval result judgment document are examined in suitability, the web pages are classified into a suitable group and a non-suitable group based on the examination results, there are extracted common words, which appear frequently in the web pages of the suitable group, and common words, which appear frequently in the web pages of the non-suitable group, and a new retrieval operation is taken based on these common words.

Apart from such a method to analyze the web pages, etc., to determine the retrieval priority, there has been known a method to analyze a user's action (instructions to a terminal equipment), after the display of the retrieval result, to determine the priority or narrow the retrieval range.

For example, Patent Document 2 discloses a technical matter in which properties of information acquired by a user are recognized from cookie or an Internet temporary file, and the information suited to such properties is subject to retrieval first and then the retrieval result is outputted.

Patent Document 1: Japanese Patent Provisional Publication No. 2002-215642

Patent Document 2: Japanese Patent Provisional Publication No. 2004-510257

DISCLOSURE OF THE INVENTION

Subject to be Solved by the Invention

However, none of the above-mentioned prior arts discloses a method to analyze a user's action, in which a lapse time from when displaying the retrieval result to when the user takes action is taken into consideration.

An example of an object of the present invention, which has been made in view of the above-described problems, is therefore to provide an apparatus, a method and a program for retrieving presented information, which permit a quick access to the presented information suited to a user's purpose, by taking into consideration a lapse time from when displaying the retrieval result to when the user takes action.

Means to Solve the Subject

In order to attain the aforementioned object, an information retrieval apparatus according to an aspect of the present invention for retrieving presented information, which is suited to a user's purpose, in accordance with a request provided through a network from a terminal equipment, which provides a user with the presented information, said apparatus comprising: an access unit that accesses a storage unit, which stores priority of said presented information so as to be associated with each of the presented information; a retrieval result sending unit that sends retrieval result screen data to said terminal equipment, said retrieval result screen data forming a screen on which a retrieval result indicative of said presented information as retrieved is displayed preferentially from the presented information having a higher priority; a new retrieval result sending request-receiving unit that receives, after sending the retrieval result screen data, new retrieval result sending request data from said terminal equipment, said new retrieval result sending request data being indicative of a sending request for new retrieval result screen data; a timer unit that measures a lapse time from when sending said retrieval result screen data to when receiving said new retrieval result sending request data; and a priority changing unit that decreases said priority of the presented information, which is indicated by a retrieval result to be displayed based on the retrieval result screen data as sent, in case where said lapse time is less than a predetermined time as previously set as a period of time during which the presented information suited to the user's purpose is judged as being retrieved, and increases said priority of the presented information, which is indicated by the retrieval result to be displayed based on the retrieval result screen data as sent in case where said lapse time exceeds said predetermined time.

In order to attain the aforementioned object, an information retrieval method according to the other aspect of the present invention, used in an information retrieval apparatus that retrieves presented information, which is suited to a user's purpose, in accordance with a request provided through a network from a terminal equipment, which provides a user with the presented information, and comprises an access unit that accesses a storage unit, which stores priority of said presented information so as to be associated with each of the presented information, said method comprising: a retrieval result sending step for sending retrieval result screen data to said terminal equipment, said retrieval result screen data forming a screen on which a retrieval result indicative of said presented information as retrieved is displayed preferentially from the presented information having a higher priority; a new retrieval result sending request-receiving step for receiving, after sending the retrieval result screen data, new retrieval result sending request data from said terminal equipment, said new retrieval result sending request data being indicative of a sending request for new retrieval result screen data; a timer step for measuring a lapse time from when sending said retrieval result screen data to when receiving said new retrieval result sending request data; and a priority changing step for decreasing said priority of the presented information, which is indicated by a retrieval result to be displayed based on the retrieval result screen data as sent, in case where said lapse time is less than a predetermined time as previously set as a period of time during which the presented information suited to the user's purpose is judged as being retrieved, and increasing said priority of the presented information, which is indicated by the retrieval result to be displayed based on the retrieval result screen data as sent in case where said lapse time exceeds said predetermined time.

In order to attain the aforementioned object, an information retrieval processing program according to the other aspect of the present invention, which is to be executed by a computer included in an information retrieval apparatus that retrieves presented information, which is suited to a user's purpose, in accordance with a request provided through a network from a terminal equipment, which provides a user with the presented information, and comprises an access unit that accesses a storage unit, which stores priority of said presented information so as to be associated with each of the presented information, to cause the computer to function as: a retrieval result sending unit that sends retrieval result screen data to said terminal equipment, said retrieval result screen data forming a screen on which a retrieval result indicative of said presented information as retrieved is displayed preferentially from the presented information having a higher priority; a new retrieval result sending request-receiving unit that receives, after sending the retrieval result screen data, new retrieval result sending request data from said terminal equipment, said new retrieval result sending request data being indicative of a sending request for new retrieval result screen data; a timer unit that measures a lapse time from when sending said retrieval result screen data to when receiving said new retrieval result sending request data; and a priority changing unit that decreases said priority of the presented information, which is indicated by a retrieval result to be displayed based on the retrieval result screen data as sent, in case where said lapse time is less than a predetermined time as previously set as a period of time during which the presented information suited to the user's purpose is judged as being retrieved, and increases said priority of the presented information, which is indicated by the retrieval result to be displayed based on the retrieval result screen data as sent in case where said lapse time exceeds said predetermined time.

Figure 1:
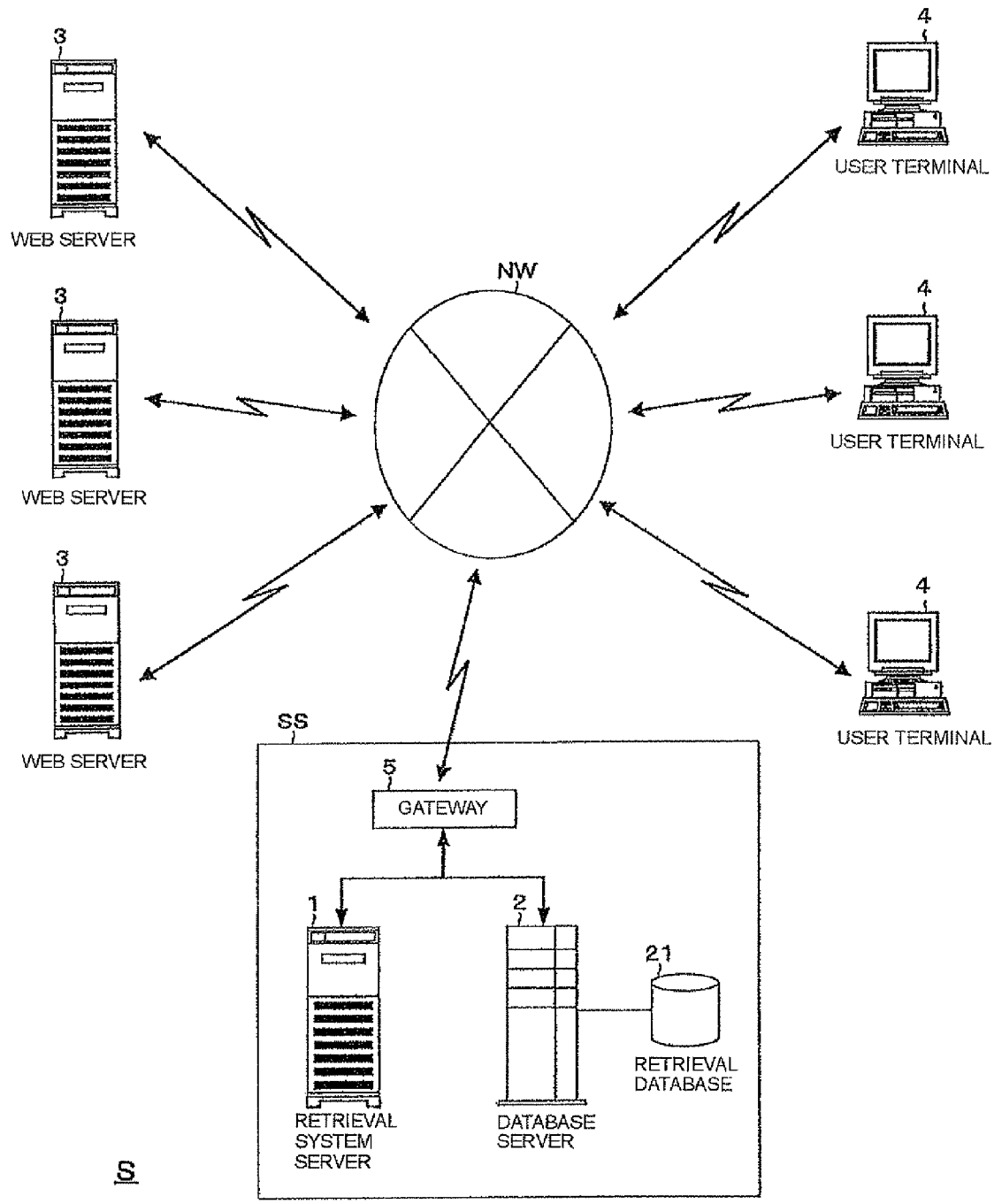
FIG. 1 is a block diagram showing an example of a schematic configuration of a web retrieval system "S" according to the first embodiment of the present invention.

EXPLANATION OF THE REFERENCE NUMERALS 1 retrieval system server
2 database server
3 web server
4 user terminal equipment
5 gateway
11 storage unit
12 communication unit
13 system control unit
21 retrieval database
S web retrieval system
SS retrieval site system

BEST MODE FOR CARRYING OUT THE INVENTION

Now, embodiments of the present invention will be described in detail below with reference to the accompanying drawings. In the embodiments of the present invention described below, the present invention is applied to a retrieval system server in a web retrieval system.

[1. First Embodiment of Present Invention]

[1.1 Schematic Description of Structure of Speaker Recognition Apparatus and Functions Thereof]

First, schematic description of a configuration of a web retrieval system "S" and functions thereof will be given with reference to FIG. 1.

FIG. 1 is a block diagram showing an example of a schematic configuration of a web retrieval system "S" according to the first embodiment of the present invention.

As shown in FIG. 1, the web retrieval system "S" includes a retrieval site system "SS", a plurality of web servers 3, and a plurality of user terminals 4 serving as a terminal equipment.

The retrieval site system "SS", the web servers 3, and the user terminals 4 are configured to be capable of sending and receiving data to and from each other through a network "NW", with the use of a communication protocol, e.g., TCP/IP (Transmission Control Protocol/Internet Protocol). The network "NW" is established by for example the Internet, leased communication lines (e.g., CATV (Community Antenna Television)), a mobile communication network (including base stations, etc.) and gateways, etc.

The retrieval site system "SS" is configured to provide a user who utilizes the user terminal 4, with a service for retrieving information source existing on the network "NW" including web pages.

In order to provide such a service, the retrieval site system "SS" includes a retrieval system server 1 serving as an example of the information retrieval apparatus, a database server 2 provided with retrieval database 21, and gateways 5. The retrieval system server 1, the database server 2 and the gateway are configured to capable of sending and receiving data to and from each other through for example a LAN (Local Area Network).

The retrieval system server 1, which has received a retrieval request from the user terminal 4, performs a retrieval processing for the web page based on a retrieval word (i.e., an example of keyword information) included in the above-mentioned request and then sends a retrieval result page (i.e., an example of retrieval result screen data) on which the retrieval result is to be displayed, to the user terminal 4. At this time, the retrieval system server 1 conducts a retrieval on the web page for the retrieval database 21 through the database server 2.

The retrieval system server 1, which is equipped with a so-called robotomorphic search engine, periodically collects from the web server 3 the web page, etc. provided therefrom and analyzes the web page as collected to establish the retrieval database 21.

The database server 2 is a server apparatus to manage the database 21. More specifically, the database server 2 is configured to execute processing of registering, updating, acquiring, etc. the data for the database 21, in response to a request from the retrieval system server 1, etc.

The gateway is configured to achieve conversion of the communication protocol between the network "NW" and the retrieval site system "SS".

On the other hand, the web server 3 is a server apparatus that provides the user terminal 4, which has accessed to the web server, with information source on the web page, etc. corresponding to a URL (Uniform Resource Locator) as requested.

The user terminal 4 is a terminal apparatus, which accesses the retrieval system server 1 or the web server 3 and acquires the web page, etc. from the above-mentioned server apparatus to display the same on a screen. For example, a personal computer, a PDA (Personal Digital Assistant), a cell-phone or the like, in which a web browser application or an e-mail application has been installed, may be applied.

[1.2 Schematic Description of Structure of Retrieval System Server and Database Server and Functions Thereof]

Figure 2:
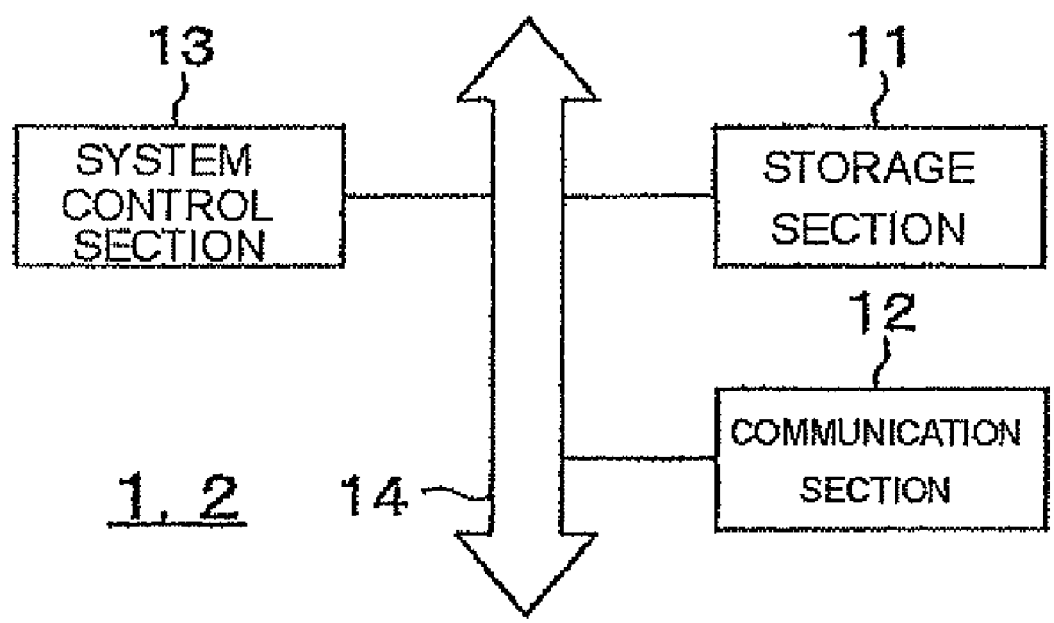
FIG. 2 is a block diagram showing an example of a configuration, which is common between a retrieval server 1 and a database server 2 according to the first embodiment of the present invention.
Figure 3:
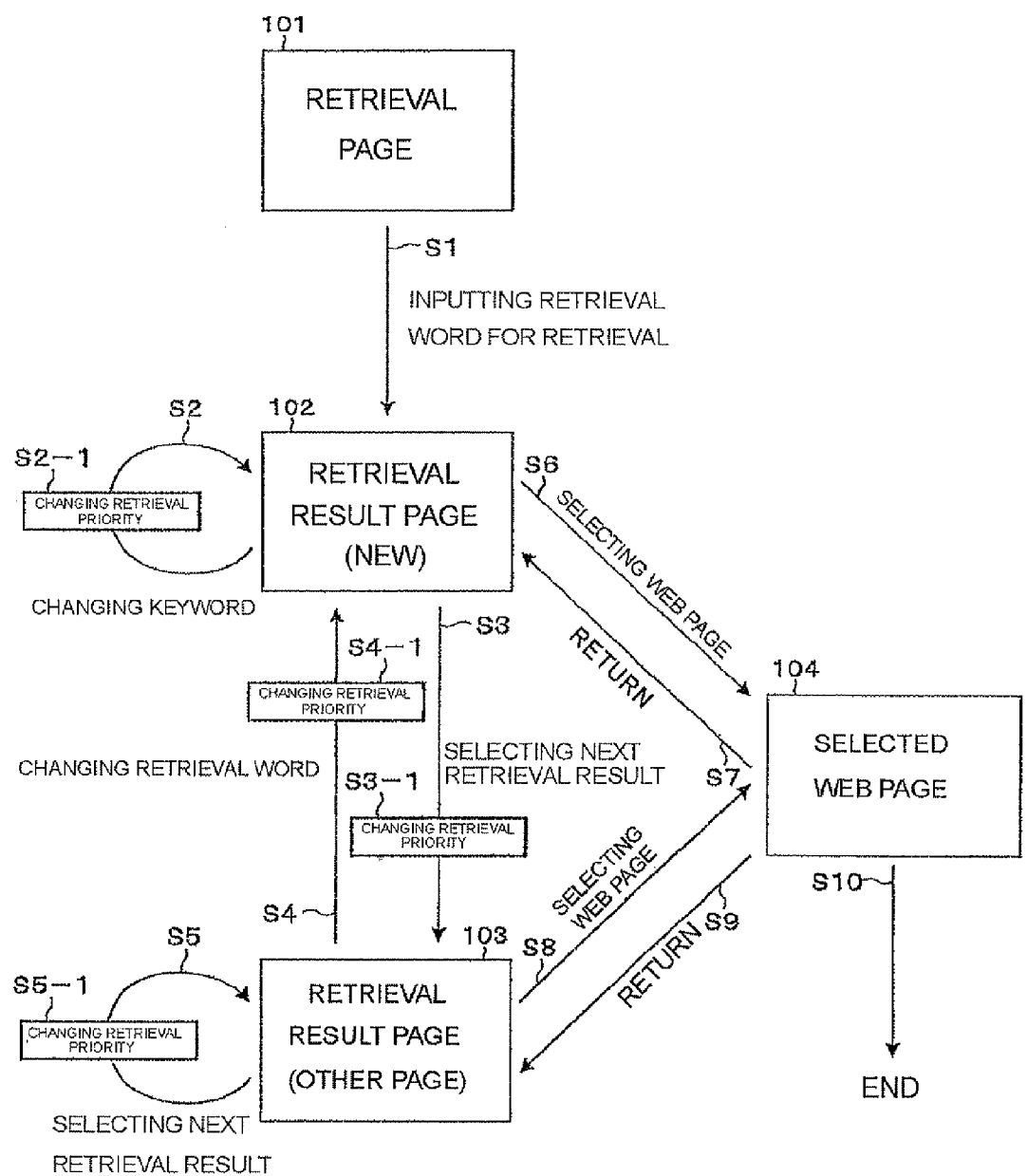
FIG. 3 is a transition diagram showing an example of transition of a web page displayed on a screen of terminal equipment 4 of a user in the web retrieval system "S" according to the first embodiment of the present invention.

Now, schematic description of configurations of the retrieval system server 1 and the database server 2 and functions thereof will be given with reference to FIGS. 2 and 3. FIG. 2 is a block diagram showing an example of a configuration, which is common between the retrieval server 1 and the database server 2 according to the first embodiment of the present invention. FIG. 3 is a transition diagram showing an example of transition of the web page displayed on a screen of the user terminal 4 in the web retrieval system "S" according to the first embodiment of the present invention.

As shown in FIG. 2, each of the retrieval system server 1 and the database server 2 includes a storage section 11 (e.g., a hard-disc drive, etc.), which stores various kinds of programs and data, a communication section 12, which connects to the network "NW" to control communication conditions to the user terminals 4, etc., and a system control section 13 having a CPU (Central Processing Unit), a ROM (Read Only Memory), a RAM (Random Access Memory), etc. The system control section 13 is connected to the storage section 11 and the communication section 12 through a system bus 14.

The database 21 is established in the storage section 11 (i.e., an example of the storage unit) of the database server 2. The database 21 includes index information registered therein, which includes a URL of the web page, a title, a summary, retrieval words, etc., as analysis results of the web page collected by the respective web server 3.

Retrieval priority (i.e., an example of priority) to the web page for the respective keywords is set in the above-mentioned index information. The retrieval priority is indicative of priority based on which retrieval results are to be displayed, when displaying on a retrieval result page the retrieval results such as a link (i.e., an example of link information) indicative of the URL of the web page as retrieved, a title, a summary, etc.

In case where information on a plurality of web pages is retrieved for example, all the retrieval results are not displayed on a single retrieval result page, but they are divided into parts and displayed on the plurality of pages. At this time, the retrieval result for the web page having a relatively higher retrieval priority is displayed on a more anterior retrieval result page. More specifically, from a standpoint of a user, the retrieval result on the web page having a relatively higher retrieval priority may be displayed in the smaller number of operations as taken.

In addition, of the retrieval results on the plurality of web pages to be displayed on the same retrieval result page, the retrieval result for the web page having a relatively higher retrieval priority is displayed in a more precedent position on the retrieval result page. More specifically, from a standpoint of a user, the retrieval result on the web page having a relatively higher retrieval priority is displayed at a position in which the corresponding link can easily be selected.

An information retrieval processing program is stored in the storage section 11 of the retrieval system server 1. This information retrieval processing program may be acquired from for example the other server, etc., through a LAN, etc., or may be recorded on a disc such as a CD-ROM, etc so as to be readable by a drive apparatus.

The system control section 13 of the retrieval system server 1 (the "system control section 13" is hereinafter indicative of the "system control section 13 of the retrieval system server 1") constitutes an example of an access unit, a retrieval result sending unit, a new retrieval result sending request-receiving unit, a timer unit and a priority changing unit in the embodiment of the present invention.

The CPU reads out the various kinds of programs stored in the ROM or the storage section 11 to execute these programs, and causes the system control section 13 to control component parts of the retrieval system server 1 and causes the CPU to function as the respective units as described above.

More specifically, the system control section 13 is configured to change the retrieval priorities of all the web pages, which are indicated by the retrieval result displayed on the most recent retrieval result page, based on a lapse time "t" from when sending the retrieval result page to the user terminal 4 to when receiving a request for a new retrieval result page from the above-mentioned user terminal 4. A method for changing the retrieval priority will be described with reference to FIG. 3.

As shown in FIG. 3, a retrieval page 101 is displayed first on a screen of the user terminal 4. The retrieval page 101 is constituted by a retrieval word inputting area at which the retrieval word is to be inputted, and a retrieval button. When a user inputs the retrieval word and then selects the retrieval button (Step S1), a retrieval result page 102 on which the retrieval result corresponding to the retrieval word is displayed, is displayed on the screen. This retrieval result page 102 is constituted by the retrieval word inputting area (in which the retrieval word used for retrieval has previously been inputted), the retrieval button, the retrieval result (in case where the web pages are prioritized in increasing order of retrieval priority to the retrieval word (hereinafter referred to as the "priority order"), information (an URL, a title, a summary, etc.) on between the first web page and, for example, the tenth web page), a link to cause the other retrieval result page than the currently displayed page to be displayed (e. g., "1 2 3 4 5 6 7 8 9 Next" (the number denoting a page number and "Next" indicating the next page relative to the retrieval page currently displayed), etc.

When the user make a change by resetting the retrieval word in the retrieval input area, adding a retrieval word or deleting a part of the retrieval words, and then selects the retrieval button again (Step S2), there is displayed a retrieval result page 102 on which the retrieval result corresponding to the retrieval word as changed is displayed. At this time, the retrieval priorities for the respective web pages in the retrieval results displayed on the most recent retrieval result page are changed (Step S2-1; the detailed description will be given later).

When the user selects a link to cause the other retrieval result page than the currently displayed page to be displayed, or a link to cause a retrieval result page, which has been obtained by re-sorting the retrieval result with the different key from the currently displayed key, to be displayed (Step S3), a retrieval result page 103 corresponding to the selected page is displayed on the screen. At this time, the retrieval result as displayed on for example the second page is information on from the web page having the eleventh retrieval order for this retrieval word to the web page having the twentieth retrieval order. The retrieval priorities for the respective web pages in the retrieval results displayed on the most recent retrieval result page are also changed (Step S3-1).

When the user changes the retrieval word in the retrieval word input area, and then selects the retrieval button again (Step S4), there is displayed a retrieval result page 102 on which the retrieval result corresponding to the retrieval word as changed is displayed. On the other hand, when the user selects a link to cause the other retrieval result page than the currently displayed page to be displayed (Step S5), a retrieval result page 103 corresponding to the selected page is displayed on the screen. At this time, the retrieval priorities of all the web pages, which are indicated by the retrieval result displayed on the most recent retrieval result page, is also changed (Steps S4-1, S5-1).

When the user selects a link to the web page, which the user wishes to browse, from the retrieval results in a displaying state of the retrieval result page 102 or 103 (Step S6, S8), a web page 104 as selected is displayed on the screen.

When the user selects a return button for the web browser application, or performs a switching operation for a window (Step S7, Step S9), the retrieval result page 102 or 103 is displayed on the front side of the screen. The return button is a button, which is provided on the window for the web browser application to re-display the web page, which has been displayed on the most recent retrieval result page or before it. Such an operation is performed by the user terminal 4 under the control of the web browser application.

When the user quits the web browser application or shuts down the power source of the user terminal 4 in a displaying state of the web page 104 (Step S10), display of the web page is terminated.

As being understood from FIG. 3, in case where the web page, which may be suited to the user's purpose, cannot be found on the retrieval result page 102 or 103, the retrieval word is changed and a retrieval operation is then conducted again, or the next retrieval result page is displayed.

In contrast, in case where the web page, which may be suited to the user's purpose, was found, the user causes the above-mentioned web page to be displayed tentatively. When the user browses the web page and considers this web page as being suited to his/her own purpose, he or she continues to browse this web page or browses the other web page to which the above-mentioned web page is linked. In contrast, when the user considers this web page as not being suited to his/her own purpose, he or she returns to the previous retrieval result page and then conducts a retrieval operation again or causes the next retrieval result page to be displayed. When the user completes the browsing of the webpage suited to his/her purpose, he or she quits the browsing without executing any operation, or returns to the previous retrieval result page and then conducts a retrieval operation to retrieve a different web page, which may be suited to his/her purpose.

Here, in case where the web page, which may be suited to the user's purpose, cannot be found in the retrieval results displayed on the retrieval result page, a period of time from when displaying the above-mentioned retrieval result page to when displaying the other retrieval result page is assumed to be represented as "t1". In addition, in case where the web page, which may be suited to the user's purpose, was found in the retrieval results displayed on the retrieval result page, but the user browsed this web page and then considered it as not being suited to his/her purpose, a period of time from when displaying the above-mentioned retrieval result page to when displaying the other retrieval result page is assumed to be represented as "t2". Further, in case where the web page, which may be suited to the user's purpose, was found in the retrieval results displayed on the retrieval result page, and the user browsed this web page and then considered it as being suited to his/her purpose, a period of time from when displaying the above-mentioned retrieval result page to when displaying the other retrieval result page is assumed to be represented as "t3".

In comparison between "t1" and "t2", "t2" includes the period of time within which the web page, which may be suited to the user's purpose, is browsed. There is generally considered the relationship of "t1<t2". In comparison between "t2" and "t3", "t3" includes the period of time within which the user gets down to the browsing of the web page, in view of the fact that there was found the web page, which may be suited to the user's purpose. There is generally considered the relationship of "t2<t3". It may be understood from these tendencies that the lapse time "t" in the case where there was found the web page, which may be suited to the user's purpose, is longer than the lapse time "t" in the case where there was not found the web page, which may be suited to the user's purpose.

Therefore, a period of time "α", which satisfies the relationship of "t2<α≦t3", is set as a threshold. Here, there is an applicable configuration that, in case where the lapse time "t" is less than the threshold time "α" ("t" being "t1" or "t2"), the retrieval priorities of all the web pages, which are indicated by the retrieval result displayed on the most recent retrieval result page, is decreased, and in contrast, in case where the lapse time "t" is equal to or more than the threshold time "α" ("t" being "t3"), the retrieval priorities of all the web pages, which are indicated by the retrieval result displayed on the most recent retrieval result page, is increased.

Change in the retrieval priority, which is made for the retrieval and browsing operation by a single user, has an influence on all the users who access the retrieval site. Therefore, an amount of change made by a single changing operation is set not so much as a large amount of change by which the priority order is quickly changed (There is set a small amount of change so as to provide a change in priority order of about 0.01). In the embodiment of the present invention, in addition to the change in retrieval priority made in accordance with the above-described method, the retrieval priority may be changed based on the number of access, although description of it is omitted.

The threshold time "α" may be determined in any manner. For example, the system control section 13 causes statistics on the lapse time "t" to be compiled, and the period of time during which the number of requests for a new retrieval result page is "0" per minute may be set as "α", or the period of time during which the number of requests for a new retrieval result page becomes equal to or less than one-tenth of the number of requests at its peak may be set as "α". An administrator of the retrieval site system "SS" may determine it. In a different pattern, the threshold time "α" may be determined so as to satisfy the relationship of "t1<α≦t2".

[1.3 Operation of Retrieval System Server]

Figure 4:
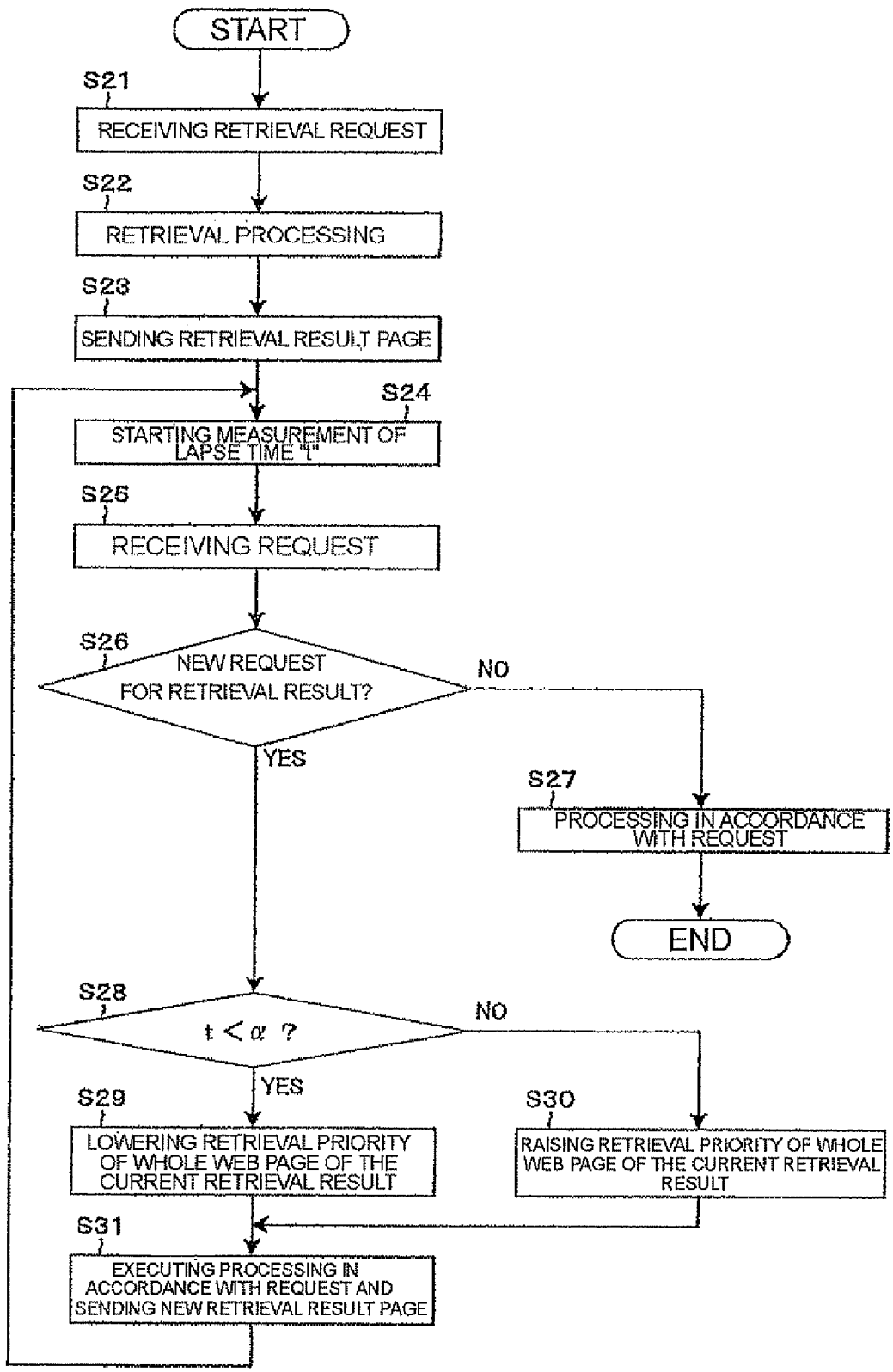
FIG. 4 is a flowchart showing an example of a flow of the processing in a system control unit 13 of the retrieval server 1 according to the first embodiment of the present invention.

Now, an operation of the system control section 13 of the retrieval system server 1 will be described below with reference to FIG. 4. FIG. 4 is a flowchart showing an example of a flow of the processing in the system control section 13 of the retrieval server 1 according to the first embodiment of the present invention.

When the user sends a retrieval request from the user terminal 4 by inputting a retrieval word in the retrieval word inputting area on the retrieval page, which has been received from the retrieval system serer 1 and displayed on the screen and then selecting the retrieval button, the system control section 13 then receives the above-mentioned request (Step S21) and executes the retrieval processing (Step S22). More specifically, the system control section 13 instructs the database server 2 to retrieve the database 21 based on the retrieval word as set in the retrieval request, and acquires the retrieval results from the database server 2, sorts the retrieval results in the priority order, and causes the storage section 11 to store them so as to associated with the user who utilizes the user terminal 4 (e.g., identification information is stored in Cookie (RFC2965) to specify the user).

Then, the system control section 13, which serves as the retrieval result sending unit, sends the retrieval result pages to the user terminal 4 (Step S23). More specifically, the system control section 13 generates the retrieval result page by embedding the retrieval results having the priority orders of from the first to the tenth into a template of the retrieval result page, and then send it to the user terminal 4.

Then, the system control unit 13, which serves as the timer unit, starts measurement of a lapse time "t" (Step S24).

Then, the new retrieval result sending request-receiving unit, which has received the request sent from the user terminal 4 (Step S25), judges as to whether or not the request as received is a request for a new retrieval result page (an example of the new retrieval result sending request data) (Step S26). In case where the request as received is not a request for a new retrieval result page (NO in Step S26), the system control section 13 executes a processing in accordance with the request (Step S27) and then terminates the processing.

In contrast, in case where the request as received is a request for a new retrieval result page, and for example, a re-retrieval request or a request for the other retrieval result page (YES in Step S26), the system control section 13 judges as to whether or not the lapse time "t" is less than the threshold time "α" (Step S28). In case where the lapse time "t" is less than the threshold time "α" (YES in Step S28), the system control section 13, which serves as the priority changing unit, decreases the retrieval priorities of all the web pages, which are indicated by the retrieval result displayed on the most recent retrieval result page (Step S29). More specifically, the system control section 13 subtracts, based on the retrieval results stored in the storage section 11, a predetermined value from the respective retrieval priorities corresponding to the retrieval word used for the retrieval processing, of all the web pages (e.g., the web pages having the priority orders of from the first to the tenth), which are indicated by the retrieval result displayed on the most recent retrieval result page, and then instructs the database server 2 to update the database 21 with the retrieval priorities as subtracted, so as to be associated with the respective web pages and the retrieval word used for the retrieval processing. After completion of this processing, the system control section 13 causes the system to move to Step S31.

In contrast, in case where the lapse time "t" is equal to or more than the threshold time "α" (NO in Step S28), the system control section 13, which serves as the priority changing unit, increases the retrieval priorities of all the web pages, which are indicated by the retrieval result displayed on the most recent retrieval result page (Step S30). More specifically, the system control section 13 adds, based on the retrieval results stored in the storage section 11, a predetermined value to the respective retrieval priorities corresponding to the retrieval word used for the retrieval processing, of all the web pages (e.g., the web pages having the priority orders of from the first to the tenth), which are indicated by the retrieval result displayed on the most recent retrieval result page, and then instructs the database server 2 to update the database 21 with the retrieval priorities as added, so as to be associated with the respective web pages and the retrieval word used for the retrieval processing. After completion of this processing, the system control section 13 causes the system to move to Step S31.

Then, the system control section 13 executes the processing in accordance with the request as received in Step S31 and then send the new retrieval result page to the user terminal 4 (Step S13). More specifically, in case where the request as received is a re-retrieval request, the system control section 13 causes the retrieval processing to be executed with the retrieval word as newly set due to change in the retrieval word (the same processing as Step S22), and causes a new retrieval page to be generated based on the above-mentioned retrieval result, and then send this page to the user terminal 4. In contrast, in case where the request as received is a request for the other retrieval result page, the system control section 13 acquires the retrieval result corresponding to the page as set in the request from the storage section 11 and then causes a new retrieval page to be generated, and then send this page to the user terminal 4. After completion of this processing, the system control section 13 causes the system to move to Step S24.

According to the embodiment of the present invention as described above, the system control section 13 of the retrieval system server 1 is capable of accessing the retrieval database 21 in which the retrieval priorities are registered so as to be associated with the respective web pages. The system control section 13 sends the retrieval result page on which the retrieval result is to be displayed, from the web page having the higher retrieval priority on a priority basis, receives, after sending the same, the re-retrieval request or the request for the other retrieval result page, which is indicative of a sending request for the new retrieval result page, and measures the lapse time "t", and then, in case where the lapse time "t" is less than the threshold time "α", the system control section 13 decreases the retrieval priorities of the web pages, which are indicated by the retrieval result displayed by the user terminal 4 based on the most recent retrieval result page, and in case where the lapse time "t" is equal to or more than the threshold time "α", the system control section 13 increases the retrieval priorities of the web pages, which are indicated by the retrieval result displayed by the user terminal 4 based on the most recent retrieval result page.

Therefore, the appropriate change in retrieval priority based on the lapse time "t" makes it possible for the user to access quickly the web page, which is suited to the user's purpose.

[2. Second Embodiment of Present Invention]

Now, the second embodiment of the present invention will be described below.

In the first embodiment as described above of the present invention, the retrieval priority of the respective web page in the retrieval result displayed on the most recent retrieval result page is changed based on the lapse time "t" from when sending the retrieval result page to the user terminal 4 to when receiving the request for the new retrieval result page from the user terminal 4. However, in the second embodiment described below of the present invention, in addition to the above-described configuration, the retrieval priority is changed based on a matter as to whether or not the retrieval result displayed on the most recent retrieval result page is re-displayed, after the user has browsed the web page, which is suited to his/her purpose.

The configuration of the retrieval system "S" and the configuration of the retrieval system server 1 are the same as those in the first embodiment of the present invention. Therefore, description of them is omitted.

[2.1 Function of Retrieval System Server]

Figure 5:
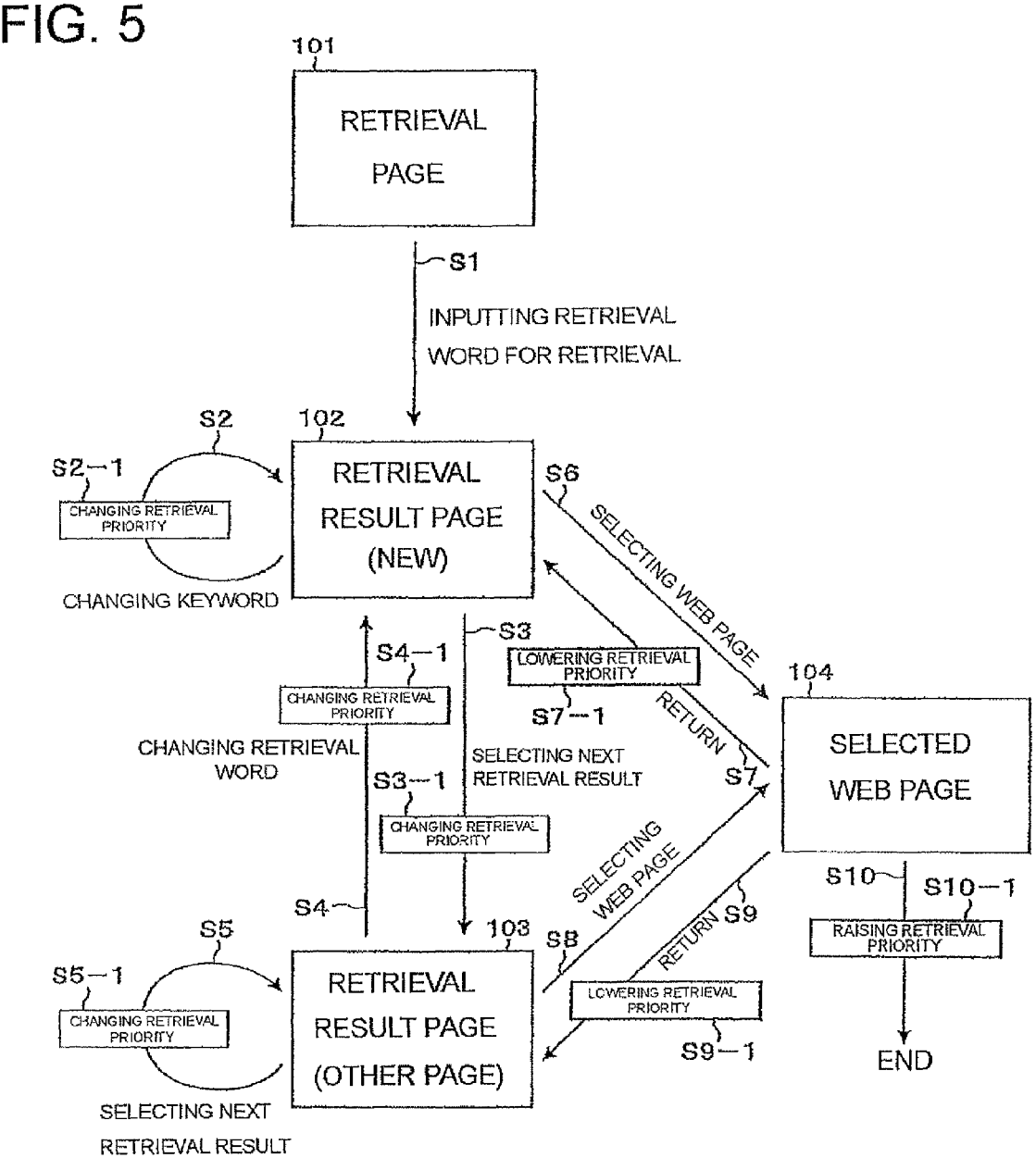
FIG. 5 is a transition diagram showing an example of transition of a web page displayed on the screen of the terminal equipment 4 of the user in the web retrieval system "S" according to the second embodiment of the present invention.

Now, description of function of the retrieval system server 1 will be given below with reference to FIG. 5. FIG. 5 is a transition diagram showing an example of transition of a web page displayed on the screen of the terminal equipment 4 of the user in the web retrieval system "S" according to the second embodiment of the present invention. In this figure, the same reference numerals are given for the corresponding same structural elements as shown in FIG. 3.

In this embodiment of the present invention, the system control section 13 of the retrieval system server 1 also serves as examples of an access notification receiving unit and a return notification receiving unit.

More specifically, it is configured that, when the retrieval result page 102 or 103 is displayed on the screen by selecting the return button for the web browser application by the user in a displaying state of the web page 104 on the screen of the user terminal 4 (Step S7, Step S9) as shown in FIG. 5, the system control section 13 decreases the retrieval priority of the web page 104 as most recently displayed (Step S7-1, S9-1). So, in case where the return button is selected, the system control section 13 judges that the web page as browsed is not the web page suited to the user's purpose, and then decreases the retrieval priority of the above-mentioned web page.

In more detailed description given, when the user selects a link to the web page included in the retrieval result during the generation step of the retrieval result page 102 or 103, the system control section 13 embeds, in the retrieval result page, scripts for causing an access notification notifying of an access to the above-mentioned web page (an example of access notification data) to be sent from the user terminal 4 to the retrieval system server 1. When the above-mentioned retrieval result page is re-displayed due to selection of the return button, the system control section 13 embeds, in the retrieval result page, scripts for causing a re-displaying notification (an example of re-displaying notification data) to be sent from the user terminal 4 to the retrieval system server 1. The system control section 13 causes browsing state data, which are indicative of the user's browsing of which web page from the retrieval result page, to be stored in the storage section 11 so as to be associated with the user, and decreases, when the retrieval result page is re-displayed, the retrieval priority of the web page as browsed.

In case where the return button for the web browser application has not been selected in a displaying state of the web page 104, e.g., the user quits the web browser application (Step S10), it is configured that the system control section 13 increases the retrieval priority of the above-mentioned web page 104. More specifically, in case where it is judged that the return button is not selected, the system control section 13 judges that the web page as browsed is the web page suited to the user's purpose, and then increases the retrieval priority of the above-mentioned web page.

When the web browser application is terminated in a displaying state of the web page 104 on the screen, any notification is not usually given from the user terminal 4 to the retrieval system server 1. The embodiment of the present invention is therefore designed so that a lapse time "t" from when selecting a link to the web page 104 from the retrieval page 102 or 013 is measured, and when this lapse time "t" exceeds a predetermined time "β" (e.g., 30 minutes, etc.), this web page 104 is judged as being suited to the user's purpose, and then the retrieval priority of the above-mentioned web page is increased.

In the method as described in the embodiment of the present invention, an explicit selection of the web page is given by the user. As a result, it is configured that variation of the retrieval priority in this case is larger than variation due to change in the retrieval priority as described in the first embodiment of the present invention.

[2.2 Operation of Retrieval System Server]

Figure 6:
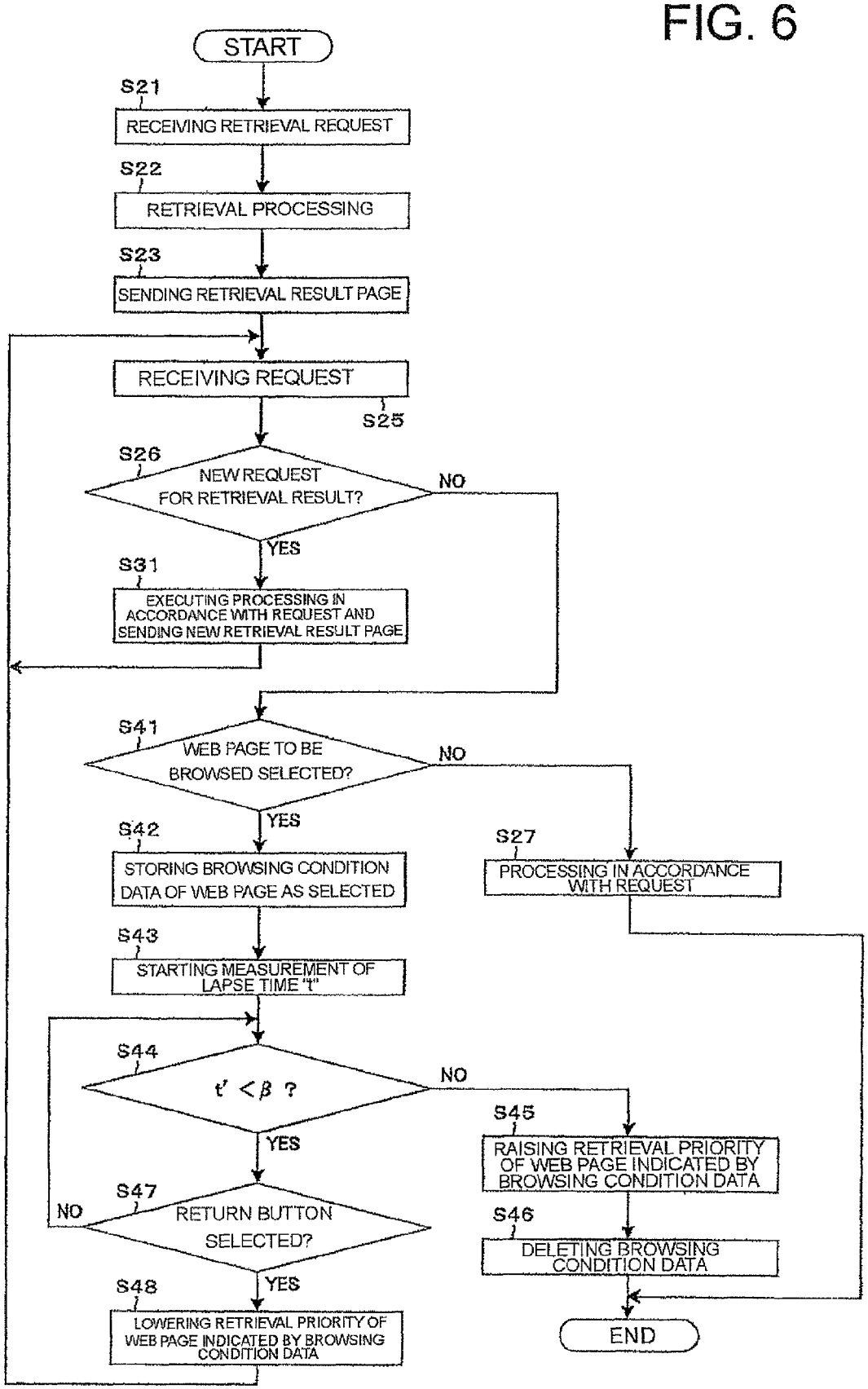
FIG. 6 is a flowchart showing an example of a flow of the processing in the system control unit 13 of the retrieval server 1 according to the second embodiment of the present invention.

Now, description of operation of the system control section 13 of the retrieval system server 1 will be given below with reference to FIG. 6. FIG. 6 is a flowchart showing an example of a flow of the processing in the system control unit 13 of the retrieval server 1 according to the second embodiment of the present invention. In this figure, the same reference numerals are given for the corresponding same structural elements as shown in FIG. 4.

Description of the processing of changing the retrieval priority described in the first embodiment of the present invention with reference to FIG. 4 is omitted in the description below for facilitation of description.

As shown in FIG. 6, the system control section 13 receives the retrieval request from the user terminal 4 and executes a retrieval processing, and then send a retrieval result page (Steps S21-S23).

When the system control section 13, which serves as the access notification receiving unit, receives a request sent from the user terminal 4 (Step S25), this section judges as to whether or not the request as received is a new request for a new retrieval result page (Step S26). In case where the request as received is the new request for the new retrieval result page, the system control section 13 executes processing in accordance with the request as received and then sends the new retrieval result page to the user terminal 4 (Step S31). AT this time, the system control section 13 also executes Steps S28-30 as shown in FIG. 4. After completion of these processing, the system control section 13 causes the system to move to Step S25.

In contrast, in case where the request as received is not the new request for the new retrieval result page (NO in Step S26), the system control section 13 judges as to whether or not the user has selected, from the retrieval result page, a link to a web page, which the user wished to browse (Step S41). More specifically, the system control section 13 judges as to whether or not the request as received is an access notification. In case where the link to the web page has not been selected (NO in Step S41), the system control section 13 executes processing in accordance with the request as received (Step S27) and then terminates the processing.

In case where the link to the web page has been selected (YES in Step S41), the system control section 13 causes a URL corresponding to the link of the selected web page to be stored as the browsing state data in the storage section 11 so as to be associated with the user, who utilizes the user terminal, and the retrieval word, which is used for the retrieval operation (Step S42).

Then, the system control section 13 starts measurement of the lapse time "t" (Step S43).

Then, the system control section 13 judges as to whether or not the lapse time "t" is less than the time "β" (Step S44). In case where the lapse time "t" is not less than the time "β" (NO in Step S44), the system control section 13, which serves as the priority changing unit, instructs the database server 2 to increase the retrieval priority of the web page, which is indicated by the browsing state data as stored, (Step S45). More specifically, the system control section 13 instructs the database server 2 to add a predetermined value to the retrieval priority corresponding to the retrieval word used for the retrieval operation, of the web page, which is indicated by the browsing state data, and then update the database 21 with the retrieval priority subject to the addition processing, so as to be associated with the web page and the retrieval word used for the retrieval operation. After completion of this processing, the system control section 13 causes the browsing state data to be deleted (Step S46) and then terminates the processing.

In contrast, in case where the lapse time "t" is less than the time "β" (YES in Step 344), the system control section 13 judges as to whether or not the return button has been selected (Step S47). More specifically, the system control section 13, which serves as the re-displaying notification receiving unit, judges as to whether or not a re-displaying notification has been sent from the user terminal 4. In case where the return button has not been selected (NO in Step S47), the system control section 13 causes the system to move to Step S44.

In case where the return button has been selected, the system control section 13, which serves as the priority changing unit, decreases the retrieval priority of the web page, which is indicated by the browsing state data as stored (Step S48). More specifically, the system control section 13 instructs the database server 2 to subtract a predetermined value from the retrieval priority corresponding to the retrieval word used for the retrieval operation, of the web page, which is indicated by the browsing state data, and then update the database 21 with the retrieval priority subject to the subtraction processing, so as to be associated with the web page and the retrieval word used for the retrieval operation. After completion of this processing, the system control section 13 causes the system to move to Step S25.

In addition to the effects provided by the operation of the retrieval system server 1 according to the first embodiment of the present invention, according to the embodiment of the present invention as described above, in case where the user selects the web page to be browsed, from the retrieval results as displayed by the user terminal 4 based on the retrieval result page as sent, the system control section 13 of the retrieval system serer 1 receives the access notification from the user terminal 4, and when the return button is selected after the user terminal 4 displays the web page as selected by the user, resulting in instruction on the re-displaying of the retrieval result page as most recently displayed, the system control section receives the re-displaying notification, and increases, when it is judged that the re-displaying notification is not received, the retrieval priority of the web page, which is indicated by the access notification.

Therefore, the retrieval priority may be increased under the judgment that the web page as finally browsed is the web page suited to the user's purpose.

The system control section 13 of the retrieval system server 1 is configured to decrease, after receipt of the re-displaying notification, the retrieval priority of the web page, which is indicated by the access notification. It is therefore possible to decrease the retrieval priority, when the web page as browsed by the user is not the web page suited to his/her purpose.

In each of the embodiments of the present invention, the webpage is applied as the presented information. However, the present invention is not limited only such embodiments. Any information presented to the user through the user terminal 4, such as still image data, video data, audio data, text data, etc. may be applied.

In the each of the embodiments of the present invention, the personal computer, etc., is applied as the user terminal 4. However, the present invention is not limited only such embodiments. Any apparatus, which provides the user with the represented information, such as a STB (Set Top Box), an IPTV (Internet Protocol Television), etc. may be applied.

When the IPTV is for example applied as the user terminal 4, applying, as the information retrieval apparatus, a server apparatus, which delivers an video program by a streaming and retrieves the program, enables a user who is inexperienced in operating the personal computer, etc., to retrieve the program suited to his/her purpose in a simple manner.

In the each of the embodiments of the present invention, the retrieval priority of the respective web page as registered in the retrieval database 21 is set for each of the retrieval words. However, there is an applicable configuration that a single retrieval priority is set for a single web page, and a common retrieval priority is applied for all the retrieval words.

The present invention is not limited only to the embodiments as described above. The embodiments of the present invention are therefore to be considered as not restrictive, and any invention, which has substantially the same structure as the fundamental concept claimed in the appended claims and provides the similar functions, is considered as being within the scope of the present invention.

What is claimed is:

1. An information retrieval apparatus for retrieving presented information, which is suited to a user's purpose, in accordance with a request provided through a network from a terminal equipment, which provides a user with the presented information, said apparatus comprising:
   a processor;
   an access unit that accesses a storage unit, which stores priority of said presented information associated with each of the presented information;
   a retrieval result sending unit that sends retrieval result screen data to said terminal equipment, said retrieval result screen data forming a screen on which a retrieval result indicative of said presented information as retrieved is displayed preferentially from the presented information having a higher priority;
   a new retrieval result sending request-receiving unit that receives, after sending the retrieval result screen data, new retrieval result sending request data from said terminal equipment, said new retrieval result sending request data indicative of a sending request for new retrieval result screen data;
   a timer unit that measures a lapse time from when sending said retrieval result screen data to when receiving said new retrieval result sending request data; and a priority changing unit that decreases said priority of the presented information, which is indicated by a retrieval result displayed based on the retrieval result screen data as sent, in case where said lapse time is less than a predetermined time as previously set as a period of time during which the presented information suited to the user's purpose is retrieved, and increases said priority of the presented information, which is indicated by the retrieval result displayed based on the retrieval result screen data as sent in case where said lapse time exceeds said predetermined time.

2. The information retrieval apparatus as claimed in claim 1, wherein:

said retrieval result screen data includes a link information embedded therein, by which said terminal equipment accesses said presented information as retrieved, based on a selection by the user; and said apparatus further comprises:

an access notification receiving unit that receives access notification data indicative of access to said presented information from said terminal equipment, when the user selects said presented information is accessed, from retrieval results displayed by said terminal equipment based on the retrieval result screen data as sent; and a re-displaying notification receiving unit that receives re-displaying notification data from said terminal equipment, when the user instructs to re-display the retrieval result based on the retrieval result screen data as sent, after said terminal equipment displays said presented information selected by the user; and wherein:

said priority changing unit increases said priority of the presented information, which is indicated by the access notification data as received, when it is judges based on predetermined conditions that said re-displaying notification data are not received.

3. The information retrieval apparatus as claimed in claim 2, wherein:

said priority changing unit decreases said priority of the presented information, which is indicated by the access notification data as received, when said re-displaying notification data has been received.

4. The information retrieval apparatus as claimed in claim 1, wherein:

said new retrieval result sending request data are data indicative of at least one of a sending request for said new retrieval result screen data, based on which the retrieval result is displayed under different conditions from the retrieval result displayed based on said retrieval result screen data, and a retrieving request with a keyword information as changed used for retrieval.

5. An information retrieval method for retrieving presented information, which is suited to a user's purpose, in accordance with a request provided through a network from a terminal equipment, which provides a user with the presented information, said method comprising:

an access step for accessing a storage unit, which stores priority of said presented information associated with each of the presented information;

a retrieval result sending step for sending retrieval result screen data to said terminal equipment, said retrieval result screen data forming a screen on which a retrieval result indicative of said presented information as retrieved is displayed preferentially from the presented information having a higher priority;

a new retrieval result sending request-receiving step for receiving, after sending the retrieval result screen data, new retrieval result sending request data from said terminal equipment, said new retrieval result sending request data indicative of a sending request for new retrieval result screen data;

a timer step for measuring a lapse time from when sending said retrieval result screen data to when receiving said new retrieval result sending request data; and a priority changing step for decreasing said priority of the presented information, which is indicated by a retrieval result displayed based on the retrieval result screen data as sent, in case where said lapse time is less than a predetermined time as previously set as a period of time during which the presented information suited to the user's purpose is retrieved, and increasing said priority of the presented information, which is indicated by the retrieval result displayed based on the retrieval result screen data as sent in case where said lapse time exceeds said predetermined time.

6. A computer-readable recording medium on which is stored an information retrieval processing program, which is executed by a computer included in an information retrieval system that retrieves presented information, which is suited to a user's purpose, in accordance with a request provided through a network from a terminal equipment, which provides a user with the presented information, to cause the computer to function as:

an access unit that accesses a storage unit, which stores priority of said presented information associated with each of the presented information;

a retrieval result sending unit that sends retrieval result screen data to said terminal equipment, said retrieval result screen data forming a screen on which a retrieval result indicative of said presented information as retrieved is displayed preferentially from the presented information having a higher priority;

a new retrieval result sending request-receiving unit that receives, after sending the retrieval result screen data, new retrieval result sending request data from said terminal equipment, said new retrieval result sending request data indicative of a sending request for new retrieval result screen data;

a timer unit that measures a lapse time from when sending said retrieval result screen data to when receiving said new retrieval result sending request data; and a priority changing unit that decreases said priority of the presented information, which is indicated by a retrieval result displayed based on the retrieval result screen data as sent, in case where said lapse time is less than a predetermined time as previously set as a period of time during which the presented information suited to the user's purpose is retrieved, and increases said priority of the presented information, which is indicated by the retrieval result displayed based on the retrieval result screen data as sent in case where said lapse time exceeds said predetermined time.

* * * * *